United States Patent
van Splunter et al.

(10) Patent No.: US 10,616,028 B2
(45) Date of Patent: Apr. 7, 2020

(54) APPARATUS FOR A RADIO DEVICE

(71) Applicant: NXP B.V., Eindhoven (NL)

(72) Inventors: Marinus van Splunter, Helmond (NL); Arie Geert Cornelis Koppelaar, Giessen (NL); Frank Leong, Veldhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/871,542

(22) Filed: Jan. 15, 2018

(65) Prior Publication Data

US 2018/0248738 A1    Aug. 30, 2018

(30) Foreign Application Priority Data

Feb. 27, 2017    (EP) .................... 17158147

(51) Int. Cl.
*H04L 27/26* (2006.01)
*G01S 13/82* (2006.01)
(Continued)

(52) U.S. Cl.
CPC ...... *H04L 27/2695* (2013.01); *G01S 13/0209* (2013.01); *G01S 13/08* (2013.01);
(Continued)

(58) Field of Classification Search
CPC ............ H04L 27/2695; H04L 27/2662; H04L 27/2659; H04L 27/2675; H04L 27/266;
(Continued)

(56) References Cited

U.S. PATENT DOCUMENTS 6,867,686 B1    3/2005   Emmerling et al.
9,485,609 B2   11/2016   Hekstra et al.
(Continued)

FOREIGN PATENT DOCUMENTS

| DE | 199 26 748 A1 | 12/2000 |
| EP | 2 767 847 A | 8/2014 |
| WO | 2009/107093 A1 | 9/2009 |

OTHER PUBLICATIONS

IEEE Computer Society, "IEEE Standard for Low-Rate Wireless Personal Area Networks (WPANs)", IEEE Std 802.15.4™-2015 (Revision of IEEE Std 802.15.4-2011), LAN/MAN Standards Committee, pp. 1-709 (2015).

*Primary Examiner* — Aristocratis Fotakis
*Assistant Examiner* — Amneet Singh
(74) *Attorney, Agent, or Firm* — Rajeev Madnawat (57) ABSTRACT

An apparatus is configured to, based on a first signal comprising one or more data transmission frames received from a first radio device by a second radio device. The first signal has a particular carrier frequency of a carrier wave thereof and the one or more data transmission frames comprising a plurality of symbols provided at a particular symbol frequency. The carrier frequency and symbol frequency based on a reference clock frequency of the first radio device. One or more of an estimate of the particular carrier frequency is determined and an estimate of the particular symbol frequency relative to a reference clock frequency of the second radio device and provide for transmission of a response signal from the second radio device to the first radio device.

13 Claims, 2 Drawing Sheets

(51) Int. Cl.
*G01S 13/76* (2006.01)
*G07C 9/00* (2020.01)
*G01S 13/84* (2006.01)
*G01S 13/02* (2006.01)
*G01S 13/08* (2006.01)
*H04L 27/00* (2006.01)

(52) U.S. Cl.
CPC .......... *G01S 13/765* (2013.01); *G01S 13/825* (2013.01); *G01S 13/84* (2013.01); *G07C 9/00309* (2013.01); *H04L 27/266* (2013.01); *H04L 27/2659* (2013.01); *H04L 27/2662* (2013.01); *H04L 27/2675* (2013.01); *H04L 2027/0026* (2013.01); *H04L 2027/0095* (2013.01)

(58) Field of Classification Search
CPC ..... H04L 2027/0095; H04L 2027/0026; G01S 13/0209; G01S 13/08; G01S 13/84; G01S 13/825; G01S 13/765; G07C 9/00309
See application file for complete search history.

(56) References Cited

U.S. PATENT DOCUMENTS

| | | | |
|---|---|---|---|
| 2009/0268916 A1* | 10/2009 | Miyagi | H03C 3/40 381/3 |
| 2009/0310691 A1 | 12/2009 | Park et al. | |
| 2010/0109914 A1* | 5/2010 | Tieman | G08G 1/005 340/991 |
| 2011/0090837 A1* | 4/2011 | Duchscher | H04L 1/0057 370/312 |
| 2016/0003940 A1* | 1/2016 | Seller | G01S 13/84 342/132 |
| 2018/0287826 A1* | 10/2018 | Lindskog | H04L 25/0226 |

* cited by examiner

# APPARATUS FOR A RADIO DEVICE

CROSS-REFERENCE TO RELATED APPLICATIONS

This application claims the priority under 35 U.S.C. § 119 of European Patent application no. 17158147.3, filed on Feb. 27, 2017, the contents of which are incorporated by reference herein.

This disclosure relates to an apparatus for a radio device and an associated method.

BACKGROUND OF THE DISCLOSURE

Wideband Radio Frequency (RF) applications have been developed that are capable of accurate distance measurement between two or more wireless devices. These measurements are based on Time-of-Flight (ToF) calculations which are derived by accurate determination of departure and arrival times of RF packets between two devices. RF packets travel at the speed of light and thus a calculated ToF allows determination of the distance between devices. Such a procedure is commonly called 'Ranging'. One practical application of Ranging is 'Distance Bounding' whereby ToF calculations are used to verify whether the distance between two devices is less than a predefined threshold, such as used for automotive Passive Keyless Entry (PKE) systems and other access control systems, as well as for contactless electronic payment systems.

In systems, such as PKE, one of the wireless devices typically has more available power than the other. For example, a PKE system typically comprises a first radio device in a key-fob with a smaller battery and a second radio device in an automobile with a larger battery providing it with power. Accordingly, the power available to the two radios is asymmetric. In one or more examples, there may be asymmetries in processing capabilities between the two radio devices. For example, the key-fob may have lower computational processing capabilities.

According to a first aspect of the disclosure we provide an apparatus configured to;
based on a first signal comprising one or more data transmission frames received from a first radio device by a second radio device, the first signal having a particular carrier frequency of a carrier wave thereof and the one or more data transmission frames comprising a plurality of symbols provided at a particular symbol frequency, the carrier frequency and symbol frequency based on a reference clock frequency of the first radio device;
determine one or more of an estimate of the particular carrier frequency and an estimate of the particular symbol frequency relative to a reference clock frequency of the second radio device and provide for transmission of a response signal from the second radio device to the first radio device, the response signal provided with one or more of a reply carrier wave having a carrier frequency comprising the determined estimate of the particular carrier frequency and a plurality of symbols of one or more data transmission frames of the response signal provided at a reply symbol frequency comprising the determined estimate of the particular symbol frequency.

In one or more embodiments, the first radio device is powered by a battery and the second radio device has a greater amount of electrical power available thereto than that provided by the battery for the first radio device.

In one or more embodiments, one or more of the data transmission frames from the first radio device and the data transmission frames from the second radio device comprise ranging frames used to determine the distance between the first radio device and the second radio device.

In one or more embodiments, the first radio device and the second radio device are configured to provide the first signal and the response signal in accordance with an Impulse Radio Ultra Wide Band protocol.

In one or more examples, the Impulse Radio Ultra Wide Band protocol comprises one or more of IEEE 802.15.4 UWB PHY, ZigBee and a pulsed radar protocol.

In one or more embodiments, the apparatus is configured to provide a first synchronisation mode and a second synchronisation mode for transmission of response signals, wherein in the first synchronisation mode one or more data transmission frames are provided with a first number of synchronisation symbols to allow the first radio device to synchronise with the second radio device and in the second synchronisation mode one or more data transmission frames are provided with a second number of synchronisation symbols, less than the first number, to allow the first radio device to synchronise with the second radio device, the second synchronisation mode provided for response signals sent using the one or more of an estimate of the particular carrier frequency and an estimate of the particular symbol frequency relative to a reference clock frequency of the second radio device, and the first synchronisation mode provided for response signals sent not using the one or more of an estimate of the particular carrier frequency and an estimate of the particular symbol frequency relative to a reference clock frequency of the second radio device.

In one or more embodiments, the apparatus is configured to provide for the transmission of the response signal with the one or more of the determined estimate of the particular carrier frequency and the determined estimate of the particular symbol frequency by one or more of:
  i) controlling a frequency offset to the reference clock frequency of the second radio device based on the one or more determined estimates to provide for generation of the response signal with the frequency offset;
  ii) controlling a multiplication ratio of the reference clock frequency of the second radio device based on the one or more determined estimates, wherein the reference clock frequency is provided by a phase locked loop;
  iii) controlling digital generation of the one or more data transmission frames of the response signal based on the one or more determined estimates.

In one or examples, the control of digital generation comprises fractional resampling for the determined estimate of the particular symbol frequency and by way of I/Q rotation for the determined estimate of the particular carrier frequency.

In one or more embodiments, the apparatus is configured to provide for sending of a message from the second radio device to the first radio device, prior to the sending of the first signal and response signal, to indicate that the response signal will be sent with the one or more of the determined estimate of the particular carrier frequency and the determined estimate of the particular symbol frequency.

According to a second aspect of the disclosure we provide an electronic device including the second radio device and the apparatus of the first aspect.

In one or more embodiments, the electronic device comprises at least one of:
an access control system for a building;
a passive keyless entry and/or start system for an automobile;
a contactless payment terminal;
an automatic teller machine.

According to a third aspect of the disclosure we provide a method comprising:
based on a first signal comprising one or more data transmission frames received from a first radio device by a second radio device, the first signal having a particular carrier frequency of a carrier wave thereof and the one or more data transmission frames comprising a plurality of symbols provided at a particular symbol frequency, the carrier frequency and symbol frequency based on a reference clock frequency of the first radio device;
determining one or more of an estimate of the particular carrier frequency and an estimate of the particular symbol frequency relative to a reference clock frequency of the second radio device and providing for transmission of a response signal from the second radio device to the first radio device, the response signal provided with one or more of a reply carrier wave having a carrier frequency comprising the determined estimate of the particular carrier frequency and a plurality of symbols of one or more data transmission frames of the response signal provided at a reply symbol frequency comprising the determined estimate of the particular symbol frequency.

In one or more embodiments, the method comprises providing a first synchronisation mode and a second synchronisation mode for transmission of response signals, wherein
in the first synchronisation mode one or more data transmission frames are provided with a first number of synchronisation symbols to allow the first radio device to synchronise with the second radio device and;
in the second synchronisation mode one or more data transmission frames are provided with a second number of synchronisation symbols, less than the first number, to allow the first radio device to synchronise with the second radio device,
the second synchronisation mode provided for response signals sent using the one or more of an estimate of the particular carrier frequency and an estimate of the particular symbol frequency relative to a reference clock frequency of the second radio device, and the first synchronisation mode provided for response signals sent not using the one or more of an estimate of the particular carrier frequency and an estimate of the particular symbol frequency relative to a reference clock frequency of the second radio device.

According to a fourth aspect of the disclosure we provide a computer readable medium comprising computer program code stored thereon, the computer readable medium and computer program code being configured to, when run on at least one processor, perform at least the following:
based on a first signal comprising one or more data transmission frames received from a first radio device by a second radio device, the first signal having a particular carrier frequency of a carrier wave thereof and the one or more data transmission frames comprising a plurality of symbols provided at a particular symbol frequency, the carrier frequency and symbol frequency based on a reference clock frequency of the first radio device;
determining one or more of an estimate of the particular carrier frequency and an estimate of the particular symbol frequency relative to a reference clock frequency of the second radio device and providing for transmission of a response signal from the second radio device to the first radio device, the response signal provided with one or more of a reply carrier wave having a carrier frequency comprising the determined estimate of the particular carrier frequency and a plurality of symbols of one or more data transmission frames of the response signal provided at a reply symbol frequency comprising the determined estimate of the particular symbol frequency.

According to a fifth aspect of the disclosure we provide an apparatus configured to control a frequency scan range of a first radio device based on a message received from a second radio device, the message indicative of the second radio device being configured to provide for transmission, to the first radio device, of a signal which is adapted to an estimated offset in a frequency reference signal of the first radio device, the frequency scan range comprising one or more of;
i) a range of possible frequencies of a carrier wave of the signal sent from the second radio device to the first radio device; and
ii) a range of possible frequencies of a symbol frequency of a plurality of symbols that form at least part of one or more data transmission frames of the signal;
wherein based on receipt of the message the apparatus provides for use of a frequency scan range using a narrower bandwidth of frequencies in order to synchronise to the signal from the second radio device than when the message is not received.

According to a sixth aspect of the disclosure we provide a method of controlling a frequency scan range of a first radio device based on a message received from a second radio device, the frequency scan range comprising one or more of;
i) a range of possible frequencies of a carrier wave of a first signal sent from the second radio device to the first radio device; and
ii) a range of possible frequencies of a symbol frequency of a plurality of symbols that form at least part of one or more data transmission frames of the first signal;
wherein based on receipt of the message the method comprises providing for use of a frequency scan range using a narrower range of frequencies in order to synchronise to a first signal from the second radio device than when the message is not received.

According to a seventh aspect of the disclosure we provide an electronic device including the first radio device and the apparatus of the fifth aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

In one or more examples, for effective communication between two radio devices each comprising a transmitter and a receiver, accurate synchronisation between the transmitter and receiver is important so that the receiver can effectively interpret the signal(s) received from the transmitter. In particular, the synchronisation between the receiver and the transmitter may provide for effective capture of data communication frames provided in the signal as well as symbols that form the frames sent by the transmitter. The symbols that form the frame may be of different types. For example, a frame may comprise synchronisation symbols that are provided at a first, typically constant, rate for use in synchronisation. Other symbols in the frame may be termed data symbols and the rate at which they are provided in the frame may be constant or vary over different sections of the frame. Each radio device may include an internal frequency reference. The frequency reference at the transmitter is used for generation of the symbols at a desired symbol frequency. In one or more systems that provide for transmission of the signal using a modulated carrier wave, the internal frequency reference may be used for generation and modulation of the carrier wave at a desired carrier frequency. The frequency reference at the receiver is used for synchronisation to the symbol frequency (or symbol frequencies) as well as, for some examples, synchronisation to the carrier frequency. Synchronisation by a receiver may comprise determination of the carrier frequency and/or the symbol frequency used by the transmitter. The frequency reference used at transmitter and receiver may be of limited accuracy. There may be a trade-off between the cost of the frequency reference and its accuracy. Due to the accuracy limitations, there will be a difference in symbol frequencies realised at transmitter and receiver, and a difference in realised carrier frequency at transmitter and receiver. These differences have to be estimated and corrected for when the receiver synchronises to the frame(s) transmitted by the transmitter.

In some situations, synchronisation can be challenging where the transmitted signals are heavily duty-cycled, leading to long silences in between bursts where the clocks that provide the frequency reference drift without ability to synchronize.

In IR-UWB (Impulse Radio-Ultra-WideBand—(such as the IEEE 802.15.4-2015 UWB PHY)) RF Ranging systems, for example, synchronization may be especially challenging, as the transmitted signals are heavily duty-cycled, leading to long silences in between signals or bursts where the clocks used for generation of the internal reference frequency drift without ability to synchronize. The drifting of the internal reference frequency may result in a transmitter transmitting a signal having an offset or a deviation from a desired symbol frequency and/or desired carrier frequency (and therefore there may be deviation from a frequency expected by the receiver), which the receiver may have to determine. In addition, drift of the reference frequency at the receiver may mean there is a further offset at the receiver.

For a receiver to synchronize to the signal transmitted by a transmitter it may have to carry out one or more of the following tasks:

Estimate and compensate for the offset between carrier frequency of the transmitter and receiver;

Estimate and correct for carrier phase offset;

Estimate and correct for offsets in the symbol frequency; and

Detect the position in time of a known marker in the received signal.

Carrier frequency and phase offset alignment takes time, but allows the receiver to detect the incoming symbols synchronously, which improves noise rejection performance, leading ultimately to improved receiver sensitivity. In one or more examples, the carrier frequency and symbol frequency may be linked. The signals and, more particularly, the frames sent by the transmitter to the receiver may include a preamble section comprising a predefined pattern of symbols (such patterns may be predefined in a communication standard) that may be identified by the receiver and used for synchronisation purposes. A cross correlation technique may be used for synchronisation searching for a correlation using different candidate frequencies, as will be familiar to those skilled in the art.

Signal exchanges between a transmitter and a receiver may be used for radio frequency ranging. An RF ranging system may employ a Time-of-Flight principle to determine the distance between two radios or markers on objects. Usually, a radio's transmitter sends out a signal (commonly a chirp or a pulse), which is either reflected by an object or retransmitted by a second radio. Based on the amount of time it takes for the reflection or retransmission to reach the originating radio's receiver, the distance between the objects can be calculated.

The ranging system's performance will be limited by how much the radio signals are degraded as they travel from transmitter to receiver. Two common degradation mechanisms are attenuation and reflection due to the radio channel. Other mechanisms include interference from other (radio) systems and thermal noise from various sources. Another main degradation mechanism is timing misalignment between the two transceivers, and therefore synchronisation between the two radios may be important for radio devices that provide for RF ranging, such as IR-UWB systems.

In time-of-flight ranging systems, the frequency reference used for determination of the symbol frequency is typically used to derive a time-of-flight which can then be translated to a range estimate.

In systems where there are long silences between transmitted signals (e.g. chips or symbols), for example IR-UWB systems, carrier and symbol clock frequency offsets resulting from a typical reference crystal (typical tolerances being in the order of several tens of ppm) may exceed the range covered by a single synchronization loop. A synchronisation loop may comprise a procedure in which a range of candidate frequencies (carrier and/or symbol frequencies) are tested to identify which candidate frequency is best fitted or has a measure of synchronisation above a threshold with the carrier and/or symbol frequencies used in generation of the transmitted signal. In cases where the offsets exceed the range covered by a single synchronization loop, multiple loops may need to be run in parallel, resulting in a hardware complexity and current consumption that scales to a first order inversely proportional with the reference frequency tolerance. In addition, a longer part of the frame may need to be reserved for synchronization, resulting in significant loss of efficiency in case the payload phase is short. The extra current consumption and receiver on-time may be especially troublesome in mobile/handheld devices, where battery capacity is limited and therefore such overhead could limit the achievable battery lifetime. In addition, the extra on-time may be associated with an increase in system latency.

Figure 1:
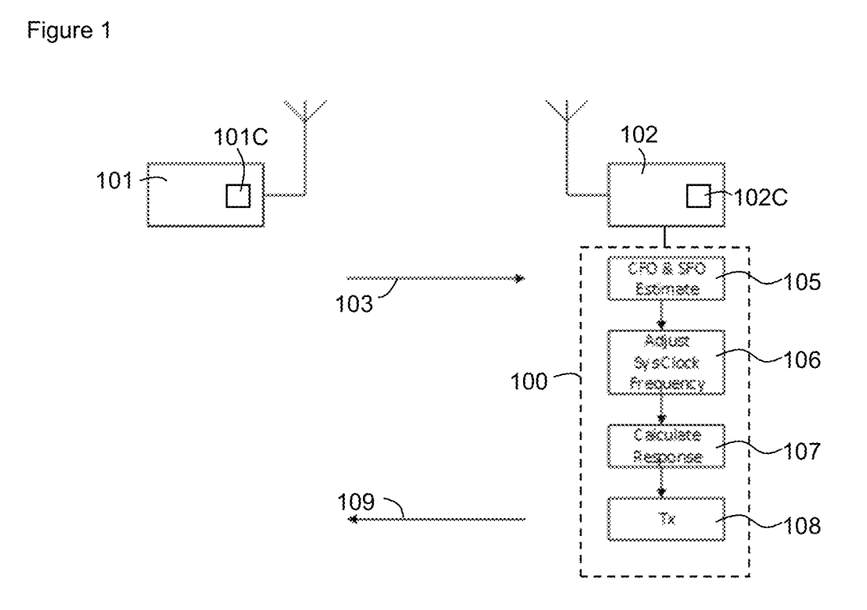
FIG. 1 shows an example embodiment of an apparatus for use with a second radio device in communication with a first radio device.

FIG. 1 shows a first radio device 101 and a second radio device 102. The first radio device 101 may have a smaller battery providing a more limited power supply than that of the second radio device 102. In one or more examples, the first radio 101 may be incorporated in a PKE fob and the second radio 102 may form a corresponding part of the PKE system in an automobile. FIG. 1 shows an apparatus 100 that is, in this example, associated with the second radio 102. The apparatus 100 may be incorporated in the circuitry of the second radio 102 or may be in communication with the second radio 102, such as part of associated circuitry.

The apparatus 100, in one or more examples, may configure a signal sent from the second radio 102 to the first radio 101 to reduce the burden of synchronisation for the first radio 101, potentially saving power and improving performance.

The apparatus 100 is configured to receive a first signal comprising one or more data transmission frames 103 from the first radio 101 via the second radio 102. The data transmission frame(s) 103 may comprise a "challenge frame" of a PKE communication scheme, which may comprise a cryptographic challenge frame. The first signal has a particular carrier frequency comprising the frequency of a carrier wave that is modulated to encode the one or more data transmission frames therein. The one or more data transmission frames comprise a plurality of symbols provided at a particular symbol frequency. It will be appreciated that in some examples the symbol frequency may vary over the frame and thus a plurality of particular symbol frequencies may be used in the same frame (e.g. for the synchronisation symbols and data symbols mentioned above), but this example will consider the frame to comprise symbols provided at a single symbol frequency for simplicity.

The carrier frequency and symbol frequency may be based on a reference frequency derived from a reference clock 101C or the like of the first radio device 101 or associated therewith. A single reference frequency may be used (with appropriate scaling) to derive the carrier frequency and symbol frequency in some embodiments or different reference frequencies may be used. As mentioned above, the reference frequency of the first radio 101 may have drifted or be affected by other factors.

Based on the first signal received at the second radio 102 from the first radio 101, the apparatus 100 may be configured to determine information indicative of the offset in the reference clock frequency of the first radio 101, which is used to generate the first signal, relative to the reference frequency of the second radio 102. It will be appreciated that while the signal sent from the first radio 101 to the second radio 102 is termed the "first signal" the signal may or may not be the first signal ever exchanged between the radios 101, 102. The first signal may be the first signal of a current communication session or a subsequent signal of the current communication session. However, in general, the term "first signal" is used to semantically distinguish the signal from other signals.

The functional process performed by the apparatus is shown in the blocks contained within apparatus 100 of FIG. 1.

In particular, the apparatus 100 may be configured to determine one or more of an estimate of the particular carrier frequency and an estimate of the particular symbol frequency of the first signal 103 relative to the reference frequency at the second radio device 102 at step 105. The one or more estimates provide an indication of the offset in the carrier frequency of the signal transmitted by the first radio 101 and an indication of the offset in the symbol frequency of the symbols of the signal transmitted by the first radio 102 relative to the reference frequency at the second radio device 102. It will be appreciated that there may be an offset in the frequency reference of the second radio 102. However, given that the particular carrier frequency and/or particular symbol frequency are determined relative to the reference frequency of the second radio device 102, any offset at the second radio device does not need to be considered. The reference frequency may be provided by a reference clock 102C or the like of the second radio device 102 or associated therewith.

The apparatus 100, in having the estimate of the particular carrier frequency of the first signal 103 relative to the reference frequency from clock 102C may adapt the carrier frequency used by the second radio 102 to transmit a response signal 109 to the first radio 101 to take account of the carrier frequency offset (CFO) of the first radio 101 relative to the second radio 102. Likewise, the apparatus 100, in having the estimate of the particular symbol frequency of the first signal 103 relative to the reference frequency from clock 102C may adapt the symbol frequency used by the second radio 102 to transmit a response signal to the first radio 101 to take account of the symbol frequency offset (SFO) of the first radio 101 relative to the second radio 102. In one or more examples, the particular carrier frequency may be determined relative to a second-radio-carrier-frequency, which is itself derived relative to the reference frequency from clock 102C. Likewise, in one or more examples, the particular symbol frequency may be determined relative to a second-radio-symbol-frequency, which is itself derived relative to the reference frequency from clock 102C.

Accordingly, as shown by step 106, the apparatus 100 may provide for adjustment of the reference frequency provided by the reference clock 102C to take account of the one or more estimates. Thus, the carrier frequency derived from the reference frequency of clock 102C may then be configured to the estimate of the particular carrier frequency. The symbol frequency derived from the reference frequency of clock 102C may then be configured to the estimate of the particular symbol frequency. In the event the particular carrier frequency and particular symbol frequency are linked in that the same offset affects both, then the apparatus 100 may apply an offset to the reference frequency and then the carrier frequency and symbol frequency used by the second radio may be derived from the offset reference frequency.

The second radio 102 or the apparatus 100 may then determine the data to provide in a response signal at step 107, which for ranging may comprise the processing time incurred by the second radio 102 and apparatus 100 from receiving the first signal to providing the response signal for transmission.

Step 107 also represents the construction of a response signal having one or more of:
  i) a carrier frequency of a carrier wave of the response signal 109 comprising the determined estimate of the particular carrier frequency; and
  ii) a symbol frequency of a plurality of symbols of at least a part of one or more data transmission frames of the response signal 109 provided at a reply symbol frequency comprising the determined estimate of the particular symbol frequency.

Thus, determination of one or both of the estimates of the carrier frequency and symbol frequency at step 105 determine which of the carrier and symbol frequencies are adapted at step 107.

Step 108 represents the transmission of the response signal 109.

The effect of providing such a response signal 109 may be a reduction in the amount of synchronisation required at the first radio 101 to interpret the response signal 109 from the second radio 102 and thereby synchronise with the second radio 102. Thus, the first radio 101 may perform a synchronisation process on receipt of the response signal 109. However, given the response signal 109 has been adapted to take account of the estimate of the frequency offset at the first radio 101, the first radio 101 may need to try fewer candidate symbol frequencies and/or candidate carrier frequencies before synchronisation is achieved. This may assume that the synchronisation strategy of the first radio 101 is to start at an expected carrier and/or symbol frequency and try, consecutively, candidate carrier and/or symbol frequencies with increasing deviation from the expected frequency(ies) until synchronisation is achieved.

Thus, the second radio 102 may expect to receive the response message with a carrier frequency CF and with a symbol frequency SF (which may be the frequencies defined in a standard). However, due to the carrier frequency offset ($CF_{offset\_at\_first\_radio}$) at the first radio 101 and the symbol frequency offset ($SF_{offset\_at\_first\_radio}$) at the first radio 101, the carrier frequency and symbol frequency used as part of the synchronisation procedure by the first radio 101 may actually comprise $CF+CF_{offset\_at\_first\_radio}$ and $SF+SF_{offset\_at\_first\_radio}$. However, the apparatus 100 has made an estimate of $CF+CF_{offset\_at\_first\_radio}$ and/or $SF+SF_{offset\_at\_first\_radio}$ relative to the carrier/symbol frequency derived from its reference frequency and the second radio 102 has provided the response message with a carrier frequency of estimate of $CF+CF_{offset\_at\_first\_radio}$ and/or estimate of $SF+SF_{offset\_at\_first\_radio}$. It will be appreciated that any offset at the second radio 102 can be disregarded as the measurements made by the apparatus 100 are relative to the reference frequency of the second radio.

Thus, if the estimate made by the apparatus 100 is accurate and the above-mentioned search strategy is followed, the first radio 101 may achieve synchronisation more quickly and use less power doing so than without the apparatus 100 providing for the transmission of the "adapted" response signal 109.

In one or more examples the apparatus 100 provides for determination of only the estimate of the particular carrier frequency used by the first radio 101. Accordingly, the response signal is provided with a carrier wave of a frequency in accordance with that estimate. The estimate of the particular symbol frequency may not be made and therefore the transmission of the response signal with the estimated symbol frequency is not performed.

In one or more examples the apparatus 100 provides for determination of only the estimate of the particular symbol frequency used by the first radio 101. Accordingly, the response signal is provided with a symbol frequency in accordance with that estimate. The estimate of the particular carrier frequency may not be made and therefore the transmission of the response signal with the estimated carrier frequency is not performed.

The response signal 109 and/or the first signal 103 may be used to determine the distance between the first radio 101 and the second radio 102. Accordingly, the one or more data transmission frames that form the first signal 103 and the response signal 109 may be termed ranging frames. It is known that the symbol frequency may be used as part of the calculation to determine the distance between the first radio device 101 and the second radio device 102. Accordingly, providing for efficient synchronisation of the symbol frequency may have the technical effect of providing efficient ranging. In one or more examples, frames sent between the first and second radio 101, 102 subsequent to the frames of the first signal 103 and the response signal 109 may be ranging frames rather than the frames of the first signal 103 and the response signal 109.

Figure 2:
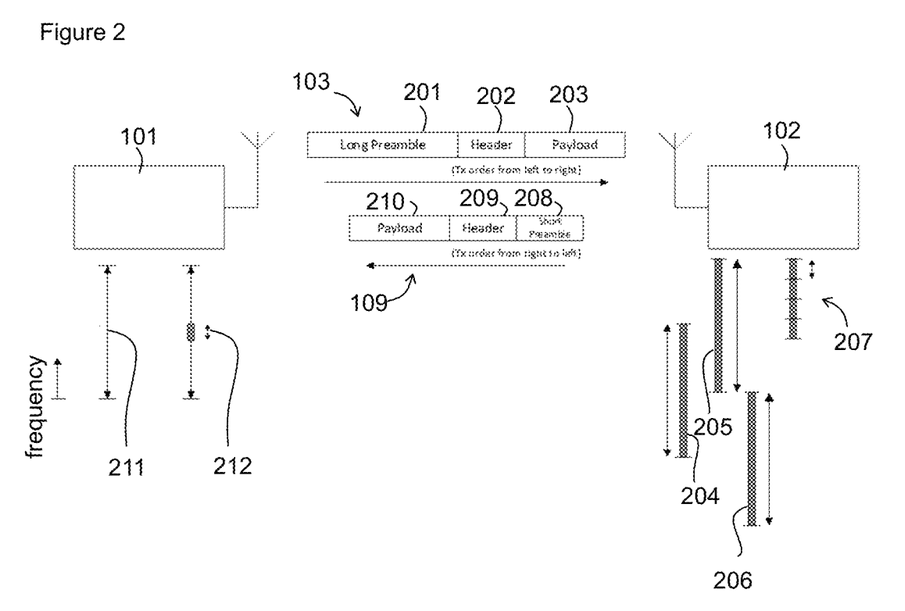
FIG. 2 shows an example embodiment similar to FIG. 1 and including example detail of the operation of the apparatus.

With reference to FIG. 2, the first radio 101 and the second radio 102 are shown. In this figure, the first signal 103 is shown as a single data transmission frame comprising; a preamble 201, which may contain predefined synchronisation symbols; a header 202, which may comprise one or more of a start-of-frame delimiter, a data rate selection field, a subnet address, a frame length field; and a payload 203, which may comprise the data to be exchanged between the first and second radios 101, 102. The frame 103 may comprise symbols provided a particular symbol frequency (or, in some examples, one or more particular frequencies).

FIG. 2 shows, diagrammatically, a first range of frequencies 204 that the second radio 102 may use to synchronise to the frame 103 and thereby the first radio 101. The second radio 102 may be configured to synchronise to the frame 103 and thereby to the first radio 101 using other overlapping or non-overlapping ranges of frequencies. Thus, the first radio 101 may be configured to step through candidate frequencies spread over the range 204 in order to provide for synchronisation. In one or more examples, the second radio 102 may include a plurality of synchronisation cores that may provide for assessment of a plurality of different frequencies spread across the different parts of the range 204 in parallel with one another. Range 207 diagrammatically shows four sub-ranges of frequencies assessed over four synchronisation cores by virtue of the division of range 207 into the four subranges. Accordingly, the second radio 102 may obtain synchronisation (with the carrier frequency and/or symbol frequency) by assessing candidate frequencies over a range of frequencies 204, 207 in series or parallel. Thus, while the term "range of frequencies" is used in this description, the ranges may be considered ranges of candidate symbol frequencies and/or ranges or candidate carrier frequencies. It will be appreciated that if there is a frequency offset at the frequency reference 102C, the ranges of candidate frequencies may be frequency shifted. For example, second range 205 may represent the frequency range scanned if the clock 102C is fast while third range 206 may represent the frequency range scanned if the clock 102C is slow relative to a nominal offset for the first range 204.

Once synchronisation has been obtained and the estimated carrier frequency and/or estimate symbol frequency have been determined, the response signal can be transmitted to the first radio 101 from the second radio 102. The response signal 109 is shown as a single data transmission frame comprising; a preamble 208, which may contain predefined synchronisation symbols; a header 209; and a payload 210, which may comprise the data to be exchanged between the first and second radios 101, 102.

The preamble 208 of the frame of the response signal 109 may be shorter than the preamble 201 of the frame of the first signal. It is expected that as the second radio 102 has estimated the particular carrier frequency and/or the particular symbol frequency of the first radio 101, fewer synchronisation symbols will be required by the first radio 101 to achieve synchronisation. Thus, the apparatus 100 may, based on the determination of one or more of the estimated carrier frequency and/or estimate symbol frequency, possibly to a predetermined threshold certainty, provide for reduction in the length of the preamble of the frame of the response signal 109. A reduced frame length may have the technical effect of reduced power consumption at the first radio 101 in processing the response signal 109. This may potentially result in significant overall power savings if more power is spent in the receiver as compared to the transmitter, as is often the case in practical IR-UWB transceiver designs.

In one or more examples the apparatus 100 is configured to provide at least a first synchronisation mode and a second synchronisation mode for transmission of response signals 109. The synchronisation modes may be configured to provide alternate lengths of a portion of the data transmission frame 109 provided for synchronisation purposes e.g. the preamble 208. The selection of one of the modes may be dependent on whether or not the apparatus 100 has prepared for transmission of the response signal that compensates for the estimate of the carrier frequency offset and/or symbol frequency offset of the first radio 101 relative to the frequency reference of the second radio 102. Accordingly, the first synchronisation mode, providing more synchronisation symbols, may be used when the apparatus has not provided for transmission with the estimated frequency(ies) and the second synchronisation mode, providing fewer synchronisation symbols, may be used when the apparatus has provided for transmission with the estimated frequency(ies). In one or more examples, the apparatus 100 may be configured to determine a measure of accuracy of its estimation of the particular carrier frequency and/or particular symbol frequency offset of the first radio 101. The length of the preamble or other synchronisation portion of the frame 109 may be based on the measure of accuracy. Thus, the more accurately the apparatus 100 determines the frequency offset, the shorter it may make the preamble 208 and vice-versa.

In one or more examples, the first synchronisation mode may provide a first number of synchronisation symbols to allow the first radio device 101 to synchronise with the second radio device 102. The second synchronisation mode may provide a second number of synchronisation symbols, less than the first number (or at least fewer in relation to reducing frame length), to allow the first radio device 101 to synchronise with the second radio device 102.

Figure 3:
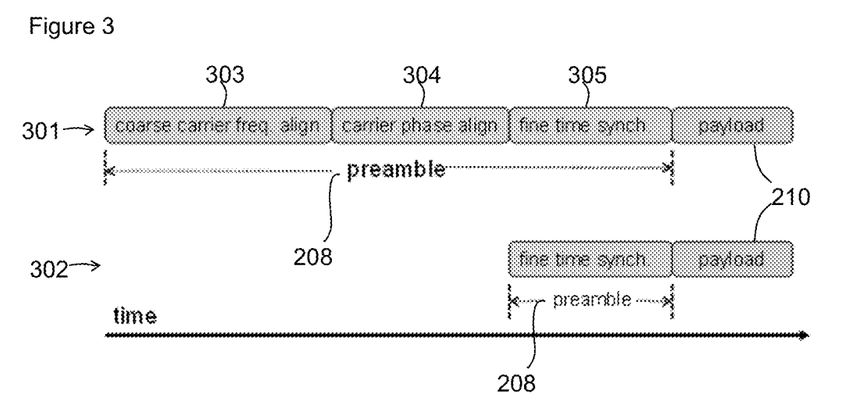
FIG. 3 shows an example synchronisation overhead sketch of a frame exchanged between the first and second radio devices.

FIG. 3 shows the frames 301 and 302 that may be sent by the second radio device 102 based on the first synchronisation mode and the second synchronisation mode respectively. In the first synchronisation mode, the preamble 208 or synchronisation portion of the frame 301 is provided with a coarse carrier frequency alignment section 303 for synchronisation of the frequency of the carrier wave, a carrier phase alignment section for alignment of the phase of the carrier wave, and a fine time synchronisation section 305 for more precise synchronisation. In the second synchronisation mode, the preamble 208 or synchronisation portion of the frame 302 is provided without the coarse carrier frequency alignment section 303, nor the carrier phase alignment section 304, and only the fine time synchronisation section 305 for more precise synchronisation.

Returning to FIG. 2, a range 211 of frequencies is shown from which candidate frequencies may be selected for synchronisation of the first radio 101 to the response signal 109 and therefore to the second radio 102. If the first radio 101 knows that the second radio 102 will adapt one or more of the carrier frequency and symbol frequency of the response signal to take account of the frequency offset at the first radio 101, the first radio may use a reduced capture range 212 of frequencies in order to synchronise to the response signal 109.

Accordingly, the first radio 101 may be considered to have two or more synchronisation modes, the synchronisation modes defining different bandwidths of frequencies that the first radio 101 will use to synchronise with the second radio 102, such as by way of a cross-correlation technique. For example, the first radio 101 may include a first synchronisation mode defined by the larger bandwidth of the range 211 and a second synchronisation mode defined by the narrower bandwidth of the range 212.

The first radio 101 may discover that the second radio 102 will adapt one or more of the carrier frequency and symbol frequency of the response signal to take account of the frequency offset at the first radio 101 based on communication using an alternate or the same communication channel. Thus, a message may be sent between the second radio 102 and the first radio 101 via a different protocol and/or using different radio circuitry and/or by way of earlier communication over the same channel. The message may indicate that the response signal 109 will be sent with one or both of the determined estimate of the particular carrier frequency and the determined estimate of the particular symbol frequency. Accordingly, the first radio 101, on receipt of the message, may adopt its second synchronisation mode with reduced capture range and in the absence of the message adopt its first synchronisation mode. It will be appreciated that if synchronisation is not achieved in the first synchronisation mode, the first radio 101 or apparatus associated therewith, may switch to the second synchronisation mode or switch off completely. If a missed message ratio of the first synchronization mode is favourable, over the lifetime of the radio, the average energy consumed per message exchange may decrease.

In one or more examples, the first radio may be configured to make a record of one or more radio devices with which it has synchronised to that provide for determination of the particular carrier frequency and/or particular symbol frequency.

The transmission of the response signal 109 with the one or more of the determined estimate of the particular carrier frequency and the determined estimate of the particular symbol frequency may be achieved in a number of ways. For example, the second radio 102 may include a module or circuitry configured to control a frequency offset to the reference clock frequency 102C of the second radio device 102 based on the one or more determined estimates to provide for generation of the response signal with the frequency offset. In one or more examples, the reference clock 102C may be provided by a phase locked loop and the apparatus 100 may be configured to provide for control of a multiplication ratio of the reference clock frequency of the second radio device 102 based on the one or more determined estimates. In one or more examples, the symbol frequency may be controlled in the digital domain by controlling digital generation of the one or more data transmission frames of the response signal based on the one or more determined estimates. In particular, a digital subsystem may be configured to rotate the frame 109 in the complex I/Q plane before up-conversion to achieve a carrier frequency shift and/or adjust a symbol clock grid by (fractional) re-sampling.

The second radio device 102 and apparatus 100 may form part of an electronic device that itself forms part of one or more of;
 i) an access control system of a building;
 ii) a passive keyless entry and/or start system of an automobile;
 iii) a contactless payment system
 iv) an ATM.

Figure 4:
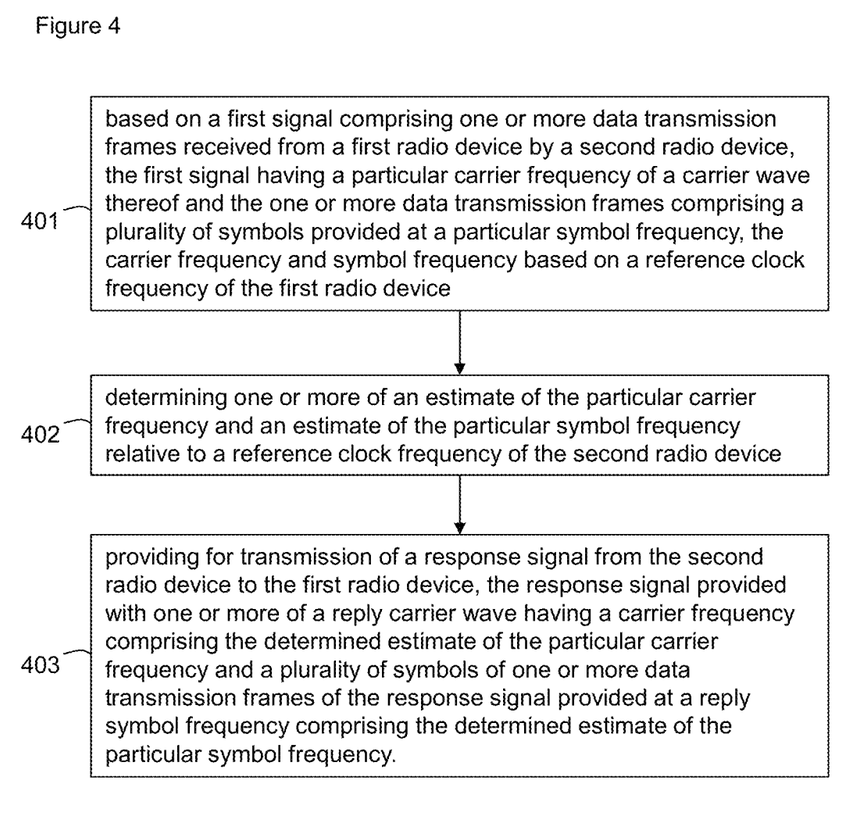
FIG. 4 shows an example flowchart illustrating a method of operation.

FIG. 4 shows a flowchart illustrating the steps of: based on 401 a first signal comprising one or more data transmission frames received from a first radio device by a second radio device, the first signal having a particular carrier frequency of a carrier wave thereof and the one or more data transmission frames comprising a plurality of symbols provided at a particular symbol frequency, the carrier frequency and symbol frequency based on a reference clock frequency of the first radio device; determining 402 one or more of an estimate of the particular carrier frequency and an estimate of the particular symbol frequency relative to a reference clock frequency of the second radio device and providing for transmission 403 of a response signal from the second radio device to the first radio device, the response signal provided with one or more of a reply carrier wave having a carrier frequency comprising the determined estimate of the particular carrier frequency and a plurality of symbols of one or more data transmission frames of the response signal provided at a reply symbol frequency comprising the determined estimate of the particular symbol frequency.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus configured to based on a first signal comprising one or more data transmission frames received from a first radio device by a second radio device, the first signal having a particular carrier frequency of a carrier wave thereof and the one or more data transmission frames comprising a plurality of symbols provided at a particular symbol frequency, the carrier frequency and symbol frequency based on a reference clock frequency of the first radio device;
  send a message from the second radio device to the first radio device to indicate that a response signal will be sent with an estimate of the particular carrier frequency and an estimate of the particular symbol frequency;
  determine the estimate of the particular carrier frequency;
  determine the estimate of the particular symbol frequency relative to a reference clock frequency of the second radio device, and
  provide for transmission of the response signal from the second radio device to the first radio device, the response signal provided with a reply carrier wave having a carrier frequency comprising the determined estimate of the particular carrier frequency and a plurality of symbols of one or more data transmission frames of the response signal provided at a reply symbol frequency comprising the determined estimate of the particular symbol frequency.

2. The apparatus of claim 1, wherein the first radio device is powered by a battery and the second radio device has a greater amount of electrical power and/or energy available thereto than that provided by the battery for the first radio device.

3. The apparatus of claim 1, wherein one or more of the data transmission frames from the first radio device and the data transmission frames from the second radio device comprise ranging frames used to determine the distance between the first radio device and the second radio device.

4. The apparatus of claim 1, wherein the first radio device and the second radio device are configured to provide the first signal and the response signal in accordance with an Impulse Radio Ultra Wide Band protocol.

5. The apparatus of claim 1, wherein the apparatus is further configured to:
provide a first synchronization mode and a second synchronization mode for transmission of the response signal wherein,
in the first synchronization mode, one or more data transmission frames are provided with a first number of synchronization symbols to allow the first radio device to synchronize with the second radio device, and
in the second synchronization mode, one or more data transmission frames are provided with a second number of synchronization symbols, less than the first number, to allow the first radio device to synchronize with the second radio device,
in the second synchronization mode, response signals are sent using the estimate of the particular carrier frequency and the estimate of the particular symbol frequency relative to the reference clock frequency of the second radio device, and
in the first synchronization mode, response signals are not sent using the estimate of the particular carrier frequency and the estimate of the particular symbol frequency relative to the reference clock frequency of the second radio device.

6. The apparatus of claim 1, wherein the apparatus is configured to provide for the transmission of the response signal with the determined estimate of the particular carrier frequency and the determined estimate of the particular symbol frequency by controlling a frequency offset to the reference clock frequency of the second radio device based on the determined estimates to provide for generation of the response signal with the frequency offset.

7. An electronic device including the second radio device and the apparatus of claim 1.

8. The electronic device according to claim 7, comprising at least one of:
an access control system for a building;
a passive keyless entry and/or start system for an automobile;
a contactless payment terminal;
an automatic teller machine.

9. The apparatus of claim 1, wherein the apparatus is configured to provide for the transmission of the response signal with the determined estimate of the particular carrier frequency and the determined estimate of the particular symbol frequency by controlling a multiplication ratio of the reference clock frequency of the second radio device based on the determined estimates, wherein the reference clock frequency is provided by a phase locked loop.

10. The apparatus of claim 1, wherein the apparatus is configured to provide for the transmission of the response signal with the determined estimate of the particular carrier frequency and the determined estimate of the particular symbol frequency by controlling digital generation of the one or more data transmission frames of the response signal based on the determined estimates.

11. A method comprising, based on a first signal comprising one or more data transmission frames received from a first radio device by a second radio device, the first signal having a particular carrier frequency of a carrier wave thereof and the one or more data transmission frames comprising a plurality of symbols provided at a particular symbol frequency, the carrier frequency and symbol frequency based on a reference clock frequency of the first radio device;
sending a message from the second radio device to the first radio device to indicate that a response signal will be sent with an estimate of the particular carrier frequency and an estimate of the particular symbol frequency;
determining the estimate of the particular carrier frequency;
determining the estimate of the particular symbol frequency relative to a reference clock frequency of the second radio device; and
providing for transmission of the response signal from the second radio device to the first radio device, the response signal provided with a reply carrier wave having a carrier frequency comprising the determined estimate of the particular carrier frequency and a plurality of symbols of one or more data transmission frames of the response signal provided at a reply symbol frequency comprising the determined estimate of the particular symbol frequency.

12. The method of claim 11, further comprising:
providing a first synchronization mode and a second synchronization mode for transmission of the response signal, wherein,
in the first synchronization mode, one or more data transmission frames are provided with a first number of synchronization symbols to allow the first radio device to synchronize with the second radio device, and;
in the second synchronization mode, one or more data transmission frames are provided with a second number of synchronization symbols, less than the first number, to allow the first radio device to synchronize with the second radio device,
in the second synchronization mode, response signals are sent using the estimate of the particular carrier frequency and the estimate of the particular symbol frequency relative to the reference clock frequency of the second radio device, and
in the first synchronization mode, response signals are not sent using the estimate of the particular carrier frequency and the estimate of the particular symbol frequency relative to the reference clock frequency of the second radio device.

13. A non-transitory computer readable medium comprising computer program code stored thereon, the non-transitory computer readable medium and the computer program code being configured to, when run on at least one processor, perform, based on a first signal comprising one or more data transmission frames received from a first radio device by a second radio device, the first signal having a particular carrier frequency of a carrier wave thereof and the one or more data transmission frames comprising a plurality of symbols provided at a particular symbol frequency, the carrier frequency and symbol frequency based on a reference clock frequency of the first radio device
sending a message from the second radio device to the first radio device to indicate that a response signal will be sent with an estimate of the particular carrier frequency and an estimate of the particular symbol frequency;
determining the estimate of the particular carrier frequency;
determining the estimate of the particular symbol frequency relative to a reference clock frequency of the second radio device; and providing for transmission of the response signal from the second radio device to the first radio device, the response signal provided with a reply carrier wave having a carrier frequency comprising the determined estimate of the particular carrier frequency and a plurality of symbols of one or more data transmission frames of the response signal provided at a reply symbol frequency comprising the determined estimate of the particular symbol frequency.

\* \* \* \* \*